United States Patent Office 2,775,576
Patented Dec. 25, 1956

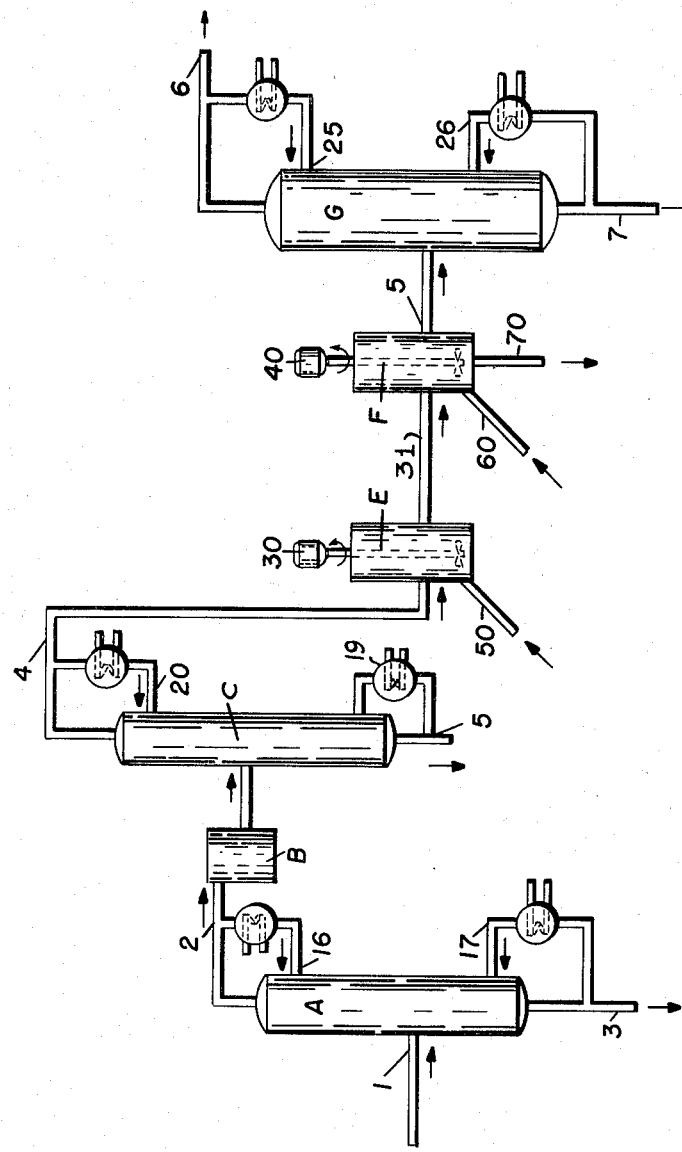

2,775,576
POLYMERS FROM STEAM CRACKED DISTILLATE STREAMS OF 18°–54° C. BOILING RANGE

Glen P. Hamner, Thomas G. Jones, Joseph A. McDaniel, Jr., and Mack C. Fuqua, Baton Rouge, La., assignors to Esso Research and Engineering Company, a corporation of Delaware Application May 20, 1953, Serial No. 356,152

3 Claims. (Cl. 260—82)

This invention is broadly concerned with the preparation of resins and polymeric materials and specifically with the polymerization of selected steam cracked distillate streams.

In general, heavier petroleum fractions such as naphtha, kerosene, gas oil, and the like, are cracked at relatively low pressures and at temperatures of 1000 to 1500° F. in the presence of steam and for relatively short contact times. The gas and liquid streams produced contain large quantities of diolefins and olefins in the $C_5$ to $C_{10}$ range. The naphtha distillate streams obtained by these steam cracking operations contain relatively large amounts of diolefins, olefins, aromatics, and some paraffins.

The process of this invention is concerned with the selection and polymerization of a $C_5$ fraction of specific boiling range and composition from which substantially all the cyclopentadiene components have been previously removed.

To obtain the selected and preferred polymerization feed streams to be used in this invention, the $C_5$ containing distillate streams are initially processed to remove the cyclopentadienes.

By an initial thermal soaking of the $C_5$ fraction boiling from the initial boiling point up to about 150° F. and sufficient heating time, the cyclopentadiene is dimerized and separated by careful vacuum or steam distillation. Preferred dimerizing temperatures are in the range of 100–220° F. The dimers are removed as a bottoms fraction from the distillation tower, the tower being operated to prevent any substantial depolymerization of the cyclodienes. In this distillation, the $C_5$ hydrocarbons boiling below the dimers are removed as an overhead distillate stream. This overhead stream, consisting of the undimerized portion, contains chiefly straight chain olefins and acyclic diolefins. These materials include isoprene as well as other $C_5$ olefins.

The initial $C_5$ fraction preferably is selected with a boiling range of 64 to 130° F. and has the following general composition:

| | Weight percent |
|---|---|
| Isoprene | 15–20 |
| Cyclopentadiene | 10–12.5 |
| Piperylene | 10–15 |
| Other diolefins | 5 |
| Tertiary olefins | 15–20 |
| Normal olefins | 20–25 |
| Paraffins | 2.5 |

Following the dimerization and separation of the cyclopentadiene dimer, the remaining $C_5$ overhead fraction has the following composition:

| | Weight percent |
|---|---|
| Isoprene | 15 |
| Piperylene | 15 |
| Other acyclic diolefins | 4–5 |
| Normal $C_5$ olefins | 20–30 |
| Tertiary olefins | 30 |
| Paraffins | 5 |

Polymerization of the reactive components in this overhead $C_5$ stream is carried out in the presence of a Friedel-Crafts type polymerization catalyst. Such catalysts as $AlCl_3$ and $BF_3$ may be used to prepare polymers ranging from drying oils to solid resins depending on the exact reaction conditions employed.

For instance, polymerization of the reaction components in this stream may be carried out in the presence of boron fluoride as a polymerization catalyst. This comprises a method for preparing polymerized oils of good quality. Under controlled conditions good polymerization activity of the reactive aliphatic $C_5$ olefins and diolefins is obtained.

These polymer oils can be used as drying oils or they can be copolymerized with other resins or drying oils for paint or varnish manufacture or formulated in printing ink. The polymers have good color and odor. The polymers may be modified by the addition of other unsaturated materials to the feed before polymerization with the $BF_3$ or after the reaction has been completed.

Using $BF_3$ as the polymerization catalyst, temperatures in the range of −20° F. to +40° F. are preferred. An inert diluent, such as hydrocarbon naphtha or hexane may be used if desired.

A polymerization of the reactive components in this stream may also be carried out in the presence of aluminum chloride as a polymerization catalyst. This comprises a method for preparing polymerized resins of good quality. Under controlled conditions, good polymerization activity of the reactive aliphatic olefins and diolefins is obtained. Using $AlCl_3$ as the catalyst, temperatures in the range of 0 to 100° F. are preferred.

The above $C_5$ resin can be used as base for paint or varnish manufacture or formulated in printing ink. The resin has a good color and odor. The resins may be modified by the addition of other materials to the feed before polymerization with the $AlCl_3$ or after the reaction has about been completed. The catalyst may be best added as an aromatic complex or sludge since the $C_5$ fraction is not a good solvent for the catalyst and tends to agglomerate the finely divided catalyst.

The polymerization reaction is carried out as a liquid phase operation. The catalyst may be added continually or batchwise. Any practical and effective methods for adding catalyst and reagents can be utilized. When the catalyst is gaseous boron fluoride, the liquid material undergoing reaction must be well agitated to insure adequate saturation of the liquid with the gas.

The time required to carry out the polymerization depends primarily on the rate that the catalyst can be added such that the reaction can be adequately controlled. The products are worked up by water or caustic washing or by washing with dilute $H_2SO_4$ (5%) followed by water washing. The catalyst residues can also be removed by precipitation as a methanol catalyst complex followed by subsequent filtration. The polmerized reaction product is then stripped free of unreacted feed components and a part, if desired, of the low molecular weight polymerization products to give the final oil or resin. The yield and softening point of the final product will depend on the degree of stripping.

The invention will be illustrated in fuller detail by the following examples.

EXAMPLE 1

A selected $C_5$ steam cracked distillate was subjected to a thermal treatment at temperatures of 180 to 200° F. to dimerize the cyclopentadiene. The resulting dimer is then removed by careful fractionation as a bottoms stream. The lighter portions were obtained as an overhead stream. A typical analysis of the 64–130° F. overhead fraction thus obtained is as follows:

| Component: | Wt. percent |
|---|---|
| Isoprene | 16.4 |
| Pentene-1 | 15.4 |
| Cis and trans pentene-2 | 7.2 |
| 2 methyl-1 butene | 14.3 |
| 2 methyl-2 butene | 5.5 |
| 3 methyl-1 butene | 13.2 |
| and n-pentene | 5.3 |
| Cis and trans piperylene | 14.9 |
| Cyclopentene | 6.5 |
| Cyclopentadiene | 0.4 |
| Cyclopentane | 0.5 |
| $C_6+$ | 0.4 |
| | 100.0 |

The above fraction (64 to 130° F.) containing $C_5$ diolefins and tertiary olefins was polymerized with $AlCl_3$ (1 wt. percent based on the fraction) with a yield of approximately 54.0 wt. percent resin. The polymerization was carried out at approximately 30–50° F. Inspections on the resin are given in Table I below:

Table I

| Analysis: | $AlCl_3$ resin |
|---|---|
| Resin yield_____percent__ | 54 |
| Softening point, ° C_____ | 97 |
| Aniline point, ° C_____ | 130 |
| Iodine number_____ | 235 |
| Color_____ | 1 |

EXAMPLE 2

Other polymerizations were carried out using substantially the same feed stream as that of the experiment in Example 1. The fraction had a boiling range from 64 to 130° F. and contained $C_5$ diolefins and tertiary olefins. This fraction was subjected to polymerization with $BF_3$ gas at a temperature of 30–40° F. The results of two typical reactions are shown in Table II.

Table II

| Analysis | 1 | 2 |
|---|---|---|
| Resin Yield | 60.1 | 54.4 |
| Softening Point, °C | 30 | 30 |
| Aniline Point, °C | 114 | 114 |
| Iodine No., cg./g | 255 | 200 |
| Color | 0 | 1 |

The results of the above two examples show that the $AlCl_3$ catalyst produced a resinous product of higher softening point while the $BF_3$ catalyst gave highly unsaturated polymeric oils which possess drying properties.

EXAMPLE 3

The invention will be better understood from the following detailed explanation which is to be read in conjunction with the accompanying schematic figure.

A debutanized steam cracked distillate containing $C_5$, $C_6$ and $C_7$ components is fed as a stream 1 to tower A, having about 30 plates and operated with 200° F. top temperature, and 350° F. bottoms temperatures at 45–50 lbs. pressure. Stream 2 is a concentrated $C_5$ fraction (IBP—130° F.) taken as an overhead stream and fed to a thermal soaking drum B. Part of stream 2 is preferably returned as liquid reflux by line 16 to tower A. The depentanized naphtha is removed from tower A as bottoms stream 3 with part returned by line 17 to the tower to supply heat required during the distillation. Stream 2 is thermally soaked in drum B for 6–16 hours at less than 220° F. to dimerize the cyclopentadienes. The thermal soaked stream 18 is then fed to tower C having 20 plates and operated with 110° F. and 240° F. top and bottom temperatures, respectively, and at 15 pounds pressure. The overhead stream 4 contains isoprene and piperylene and $C_5$ olefins. Stream 20 returns reflux to tower C. Stream 5 is a bottoms stream from tower C where the cyclopentadiene dimers are removed from the other $C_5$ components. A part of stream 5 is returned to the tower by line 19. Stream 4 is to be polymerized with a Friedel-Crafts type catalyst such as $BF_3$ in reactor E. The reactor is operated at less than 150° F., preferably 0–50° F. or lower. The catalyst is introduced continuously through line 50. The catalyst may be $BF_3$ gas or its complexes. Agitation is provided in the polymerizer by stirrer 30. The polymerized feed is passed to vessel F by line 31 for water and steam washing. Water is added by line 60. Agitation is provided by stirrer 40. The catalyst is removed with the washing water through line 70. The polymerized material is then fed to tower G by line 5. Tower G has 30 plates and is operated with 120° F. top and 400° F. bottom temperature. Overhead stream 6 contains the unreacted $C_5$ fractions. Reflux to the tower is provided by return line 25. The polymer product is removed from the bottom of tower G, through line 7. Heat is supplied to column G by the return line 26.

The polymerized product has the physical properties described generally above and more specifically shown under Examples 1 and 2.

What is claimed is:

1. In a process for the preparation of improved petroleum resins the combination which comprises isolating a steam cracked hydrocarbon petroleum fraction boiling between about more than 18° C. to less than 54° C., heating the steam cracked fraction to a temperature sufficient to dimerize substantially all cyclodienes, stripping the resulting admixture to a temperature sufficient to separate an overhead product from the dimerized cyclodienes, recovering as the overhead product a stream boiling between about more than 18° C. to less than 54° C. and having the following composition:

| | Weight percent |
|---|---|
| Isoprene | 15 |
| Piperylene | 15 |
| Other acyclic diolefins | 4–5 |
| Normal $C_5$ olefins | 20–30 |
| Tertiary olefins | 30 |
| Paraffins | 5 | said composition being substantially free of cyclodienes, and polymerizing the stream in the presence of a Friedel-Crafts catalyst at a temperature of about −4° C. to +38° C. and recovering the resin formed thereby.

2. In a process for the preparation of improved polymer oils the combination which comprises isolating a steam cracked hydrocarbon petroleum fraction boiling between about more than 18° C. to less than 54° C., heating the steam cracked fraction to a temperature sufficient to dimerize substantially all cyclodienes, stripping the resulting admixture to a temperature sufficient to separate an overhead product from the dimerized cyclodienes, recovering as the overhead product a stream boiling between about more than 18° C. to less than 54° C. and having the following composition:

| | Weight percent |
|---|---|
| Isoprene | 15 |
| Piperylene | 15 |
| Other acylic diolefins | 4–5 |
| Normal $C_5$ olefins | 20–30 |
| Tertiary olefins | 30 |
| Paraffins | 5 | said composition being substantially free of cyclodienes, and polymerizing the stream in the presence of $BF_3$ at a temperature of about −1° C. to +4° C. and recovering the resin formed thereby.

3. In a process for the preparation of improved petroleum resins the combination which comprises isolating a steam cracked hydrocarbon fraction boiling between about more than 18° C. to less than 54° C., heating the steam cracked fraction to a temperature sufficient to dimerize substantially all cyclodienes, stripping the resulting admixture to a temperature sufficient to separate an overhead product from the dimerized cyclodienes, recovering as the overhead product a stream boiling between about more than 18° C. to less than 54° C. and having the following composition:

| | Weight percent |
|---|---|
| Isoprene | 15 |
| Piperylene | 15 |
| Other acyclic diolefins | 4-5 |
| Normal $C_5$ olefins | 20-30 |
| Tertiary olefins | 30 |
| Paraffins | 5 | said composition being substantially free of cyclodienes, and polymerizing the stream in the presence of $AlCl_3$ at a temperature of about −1° C. to +10° C. and recovering the resin formed thereby.

References Cited in the file of this patent

UNITED STATES PATENTS

| | | |
|---|---|---|
| 1,836,629 | Thomas | Dec. 15, 1931 |
| 1,982,707 | Thomas | Dec. 4, 1934 |
| 1,982,708 | Thomas | Dec. 4, 1934 |
| 2,234,660 | Thomas | Mar. 11, 1941 |
| 2,349,418 | Glowacki | May 23, 1944 |
| 2,500,755 | Jones | Mar. 14, 1950 |

OTHER REFERENCES

Thomas et al.: Ind. Eng. Chem. 24, 1125–1128 (1932).
Fulton et al.: Ind. Eng. Chem. 32, 304–309 (1940).